March 14, 1961 W. B. VOISARD 2,974,730
CONTROLLABLE PITCH PROPELLER
Filed July 17, 1959 2 Sheets-Sheet 1
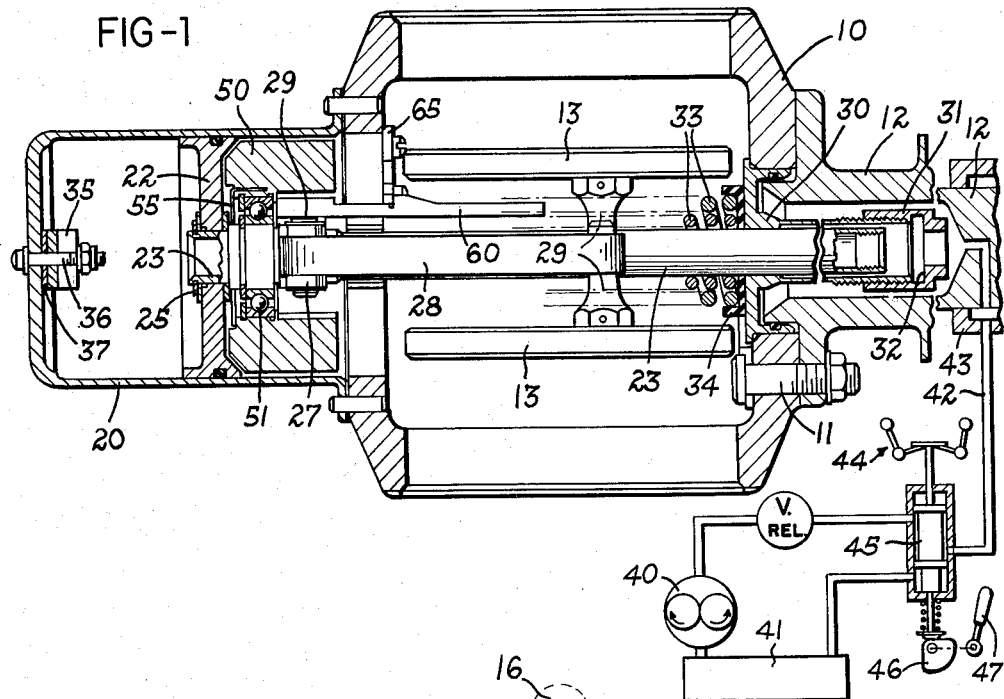
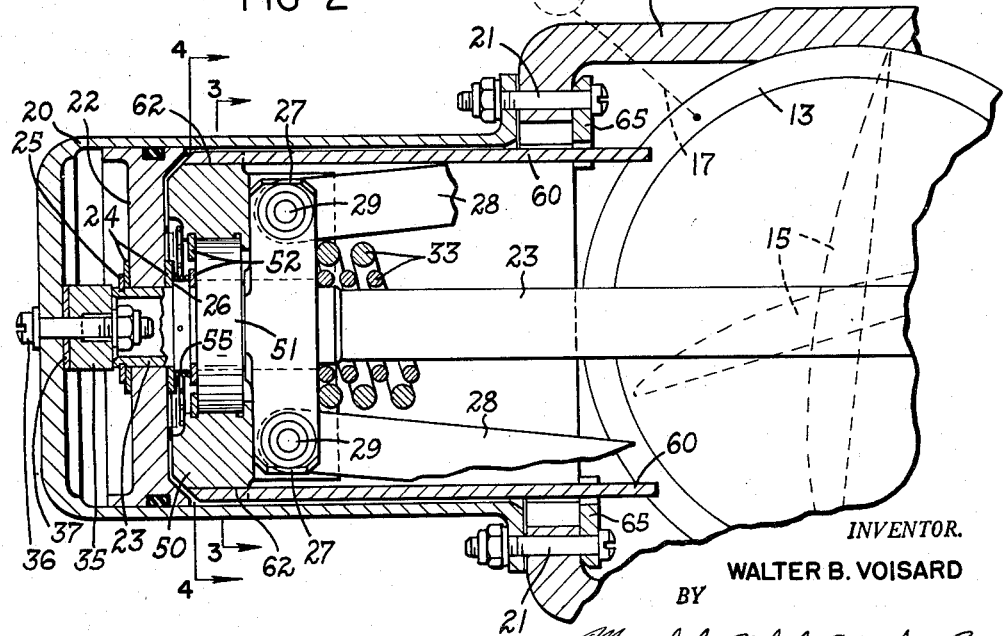
INVENTOR.
WALTER B. VOISARD
BY
*Marechal, Biebel, French & Bugg*
ATTORNEYS March 14, 1961 W. B. VOISARD 2,974,730
CONTROLLABLE PITCH PROPELLER
Filed July 17, 1959 2 Sheets-Sheet 2
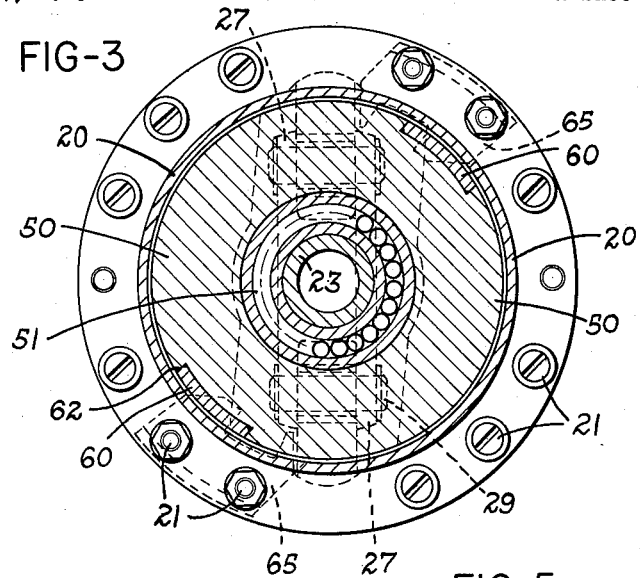
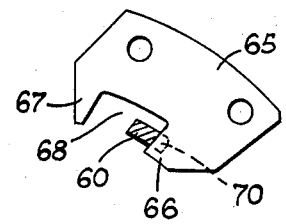
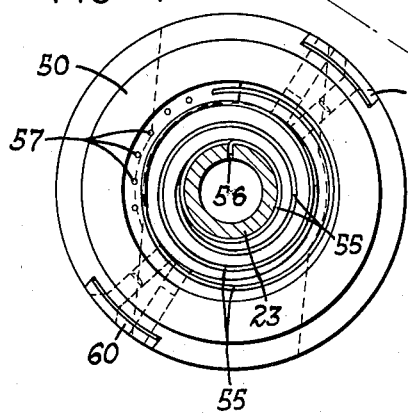
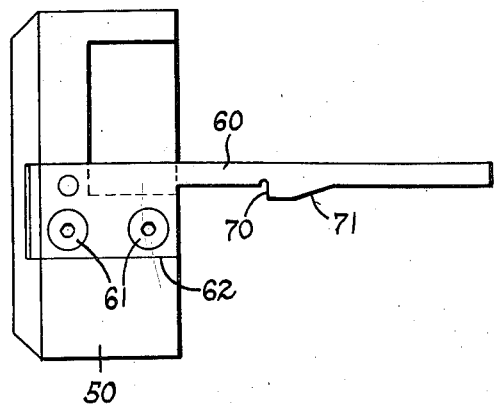
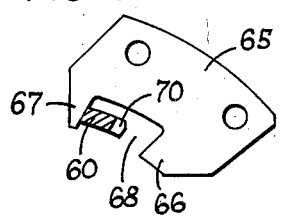
INVENTOR.
WALTER B. VOISARD
BY
ATTORNEYS

United States Patent Office 2,974,730
Patented Mar. 14, 1961

2,974,730

CONTROLLABLE PITCH PROPELLER

Walter B. Voisard, Dayton, Ohio, assignor to McCauley Industrial Corporation, Dayton, Ohio, a corporation of New York Filed July 17, 1959, Ser. No. 827,963

2 Claims. (Cl. 170—160.32)

This invention relates to controllable pitch propellers for aircraft.

The invention has particular relation to a propeller control system of the type wherein a hydraulic motor responsive to engine speed is arranged to urge the propeller blades in the direction to reduce their pitch against the biasing force of a control spring urging the blades towards a maximum pitch position, which may be full feathered position or whatever other maximum pitch position is desired.

In a propeller control system of this type, whenever the hydraulic pressure fails or is otherwise insufficient to counterbalance the force of the control spring, the spring will automatically move the blades to their maximum pitch position unless some provision is made to the contrary. This may be a desirable result for a feathering propeller in the event of engine failure in flight, since it will automatically feather the propeller upon such failure of the hydraulic control pressure. It is less desirable, however, if the same action occurs when the engine is shut off with the plane on the ground, since this means that the next time the engine is subsequently started, it must be done against the load created by having the propeller blades in their maximum pitch position in which they offer maximum resistance to turning over the engine.

It is a primary object of the present invention to provide a novel, simple and effective stop mechanism for incorporation with a propeller control system of the type outlined above which is so constructed and arranged that it will offer no interference to operation of the control system when the plane is in flight, but when the engine is shut off while the plane is on the ground, it will hold the blades in a desired low pitch position facilitating restarting of the engine.

It is particularly an object of the invention to provide a stop mechanism as outlined above which is independent of the engine speed but is responsive to acceleration and deceleration of the engine irrespective of the actual engine speed.

A further object of the invention is to provide a propeller control system incorporating a stop mechanism as outlined above wherein the movable piston rod in the hydraulic motor of the control system carries a flywheel mounted thereon for relative rotational movement in response to acceleration and deceleration of the engine, wherein the flywheel carries one of a pair of complementary latch members the other of which is mounted on the rotary hub structure, and wherein the arrangement of these latch members is such that they engage to block movement of the piston beyond a predetermined intermediate blade pitch position whenever the engine is accelerating or at a constant speed but are free of engagement whenever the engine is decelerating to provide for feathering of the blades as desired in flight.

Additional objects and advantages of the invention will be apparent from the following description, the accompanying drawings and the appended claims.

In the drawings—

Fig. 1 is a partially diagrammatic view generally in axial section through an airplane hub structure constructed in accordance with the invention;

Fig. 2 is an enlarged fragmentary view similar to Fig. 1 but at right angles thereto and showing the parts in the positions which they occupy when the propeller is feathered;

Fig. 3 is a section on the line 3—3 of Fig. 2;

Fig. 4 is a section on the line 4—4 of Fig. 2;

Figs. 5 and 6 are fragmentary views showing the latching members in their two relative limit positions; and Fig. 7 is a detail elevational view taken as indicated by the line 7—7 of Fig. 4.

Referring to the drawings, which illustrate a preferred embodiment of the invention, Fig. 1 shows at 10 the hub of an airplane propeller which is secured at 11 to the forward end of the engine shaft 12. The hub 10 carries the mountings 13 for the roots of the propeller blades indicated diagrammatically at 15, and the mountings 13 are rotatable on the hub 10 to change the pitch of the blades. Fig. 2 illustrates diagrammatically at 16 a counterweight such as may be attached as at 17 to each blade mounting; the counterweights 16 should be mounted in such manner as at least to counterbalance the centrifugal twisting moment of the associated blade and preferably to provide an over-counterweight moment tending to urge the blades in the direction to increase pitch.

The system for controlling the pitch of the blades 15 includes a hydraulic motor comprising a cylinder 20 which is mounted on the front end of the hub 10 coaxially with the shaft 12 as by screws 21 to form a portion of the rotary hub structure. The complementary piston 22 in cylinder 20 is secured on the forward end of a hollow piston rod 23, as by washers 24 and a snap ring 25 in cooperation with a shoulder 26 on the piston rod 23. The piston rod 23 includes integral yokes 27 connected by a link 28 and pin 29 with each of the blade mountings 13 in such manner that when the piston 22 is at its limit position of movement outwardly of the cylinder 20, to the right in Fig. 1, the blades 15 are at their minimum pitch, and when the piston 22 is at its limit position of movement inwardly of the cylinder, the blades are in full feathered position.

The inner or rearward end of the piston rod 23 extends slidably through a tubular support member 30 mounted at the rearward end of the hub 10. The rearward end of this support 30 is threaded for adjustably receiving a complementary nut 31 having an internal shoulder 32 which is adapted to be engaged by the rearward end of the piston rod 23 and thereby to form the low pitch stop limiting movement of the piston 22 outwardly of the cylinder 20. The piston 22 is continually biased in the direction to increase the blade pitch by one or more control springs 33 mounted in the hub structure between the yokes 27 and a cup-shaped spacer 34 which seats on the support 30. These springs 33, in cooperation with the counterweights 16, are capable of moving the piston 22 to a position establishing feathering of the blades 15, and the maximum or feather pitch stop is formed by a block 35 mounted by a bolt 36 and suitable shim 37 on the inner end face of the cylinder 30.

The force opposing the spring 33 to urge the piston 22 in the direction to decrease pitch is provided by hydraulic fluid supplied through the hollow crank shaft 12 and the piston rod 23 to the interior of the cylinder 20 from the usual pump 40 and reservoir 41 through the line 42 and transfer bearing 43. A governor 44 and governor valve 45, which may be of conventional construction, control the pressure supply to the cylinder 20 in accordance with engine speed to change the blade pitch as required to maintain the engine speed constant. Thus so long as the engine speed is below the control speed for which the governor is set, the pressure fluid will be supplied to cylinder 20 to maintain the piston 22 in the minimum blade pitch position. Whenever the engine speed rises above the control speed, the governor 44 will shift the valve 45 to the position relieving the pressure supply to the cylinder 20 and thereby allowing the spring 33 to move the piston 22 inwardly of the cylinder and thus to increase the blade pitch until the resulting increased load has slowed down the engine to the control speed range.

If the engine should fail in flight, or if the hydraulic fluid supply should fail for any other reason such as a broken oil line, the resulting rapid loss of pressure in cylinder 20 will allow the spring 33 to move the piston 22 all the way to its maximum or feather pitch position. Similarly feathering can be initiated by the pilot by shifting the governor valve 45 through the manual control 46—47 to its feather position wherein it connects the cylinder 20 directly with the reservoir 41 and thus relieves the entire hydraulic force opposing the control spring 33. However, the same result will occur when the engine is shut off with the plane on the ground and the hydraulic fluid leaks back to the reservoir. This would mean that the blades would be in maximum pitch position when the engine is to be started again, which would offer the maximum resistance to rotation of the engine shaft, and it is this result which the present invention prevents by the provision of a stop mechanism assuring that the blades remain in a relatively low pitch position after the engine is shut off.

The stop mechanism of the invention includes a flywheel 50 mounted for free rotation on the piston rod 23 between the piston 22 and the yokes 27 by means of a suitable anti-friction bearing 51. For example, the outer race of the bearing 51 may be pressed into the central bore of the flywheel 50, the inner race of the bearing may be pressed on the piston rod 23, and snap rings 52 retain the parts in this assembled relation as shown. The flywheel 50 is accordingly free to rotate on the piston rod 23, and this rotational movement is partially controlled by a torsion spring 55, one end of which is inserted in a radial bore 56 in the piston rod 23 as shown in Fig. 4, and the other end of which is inserted in one of a series of axial bores 57 in the front face of the flywheel 50 as shown in Fig. 1 and also in Fig. 4.

The flywheel 50 carries a pair of identical bars 60 mounted on opposite sides thereof for reasons of symmetry and balance, the forward ends of the bars 60 being secured by screws 61 in slots 62 in the flywheel 50. Each of the bars 60 cooperates with a latch plate 65 mounted on the inside of the hub 10 by means of the screws 21. As best seen in Figs. 5 and 6, each latch plate 60 is formed with a pair of tongue portions 66 and 67 on its inner edge which define a slot 68 therebetween for receiving the associated bar 60 therethrough.

Each bar 60 is of essentially the same width over the major portion of its length rearwardly of the flywheel 50, but it is formed at an intermediate position thereon with a forwardly facing shoulder 70, and the maximum width of the bar 60 across the shoulder 70 is sufficiently less than the width of the slot 68 for free passage therethrough. The slots 68 thus cooperate with the bars 60 to establish limits for the rotational movement of the flywheel 50 with respect to the hub structure. The range of this movement is from the position shown in Fig. 6 wherein the bar 60 is at the limit of counterclockwise movement in the slot 68 providing for unrestricted lengthwise movement of the bar in the slot, and the position in Fig. 5 wherein the bar 60 is at its limit of clockwise movement in the slot 68 and the shoulder 70 is in overlapping relation with the tongue 66.

The spring 55 is arranged to bias the flywheel 50 in clockwise direction as viewed in Fig. 4 to the limit position of the bars 60 shown in Fig. 5 wherein the shoulders 70 and tongues 66 overlap. This biasing action of the spring 55 is contrary to the direction of rotation of the hub structure as a whole. In addition, the bars 60 are so proportioned with respect to the locations of the shoulders 70 lengthwise thereof that the movements of the piston 22 within a range corresponding to the normal angular range of pitch adjustment for the blades 15, for example from 6° to 26°, the shoulders 70 will lie rearwardly of the tongues 66 and will therefore remain out of engagement therewith, irrespective of the angular position of the flywheel 50 with respect to the latch plates 65. When the shoulders 70 do engage the tongues 66, however, they hold the piston 22 against movement beyond a relatively low intermediate blade pitch position, for example 28°–30°.

The stop mechanism of the invention will therefore have no effect on the normal operation of the airplane in flight. Whenever the engine is accelerating, inertia will hold the flywheel 50 at its limit position of clockwise movement shown in Fig. 5, and the spring 55 will similarly bias the flywheel to this position whenever the engine is operating at a constant speed. Whenever the engine is decelerating in normal operation, as may result from action of the governor, the flywheel 50 will move to its other limit position shown in Fig. 6. Acceleration and deceleration of the engine may be accompanied by change in the pitch of the propeller blades, but as noted, such pitch adjustment will be in the relatively low angular range such that the shoulders 70 will always lie rearwardly of the latch plates 65.

If on the other hand a condition should develop during flight which requires feathering of the propeller, the feathering operation is initiated by moving the control 47 to its feathering position in which it shifts the valve 45 to the position connecting the interior of the cylinder 20 directly with the reservoir 41 in order to effect complete relief of the pressure supply in the cylinder. The spring 33 will therefore be free to move the piston inwardly of the cylinder, and the propeller will immediately begin to decelerate, due both to the increase in pitch as well as to the fact that the motor will normally be cut off in conjunction with feathering. Deceleration of the hub will produce an inertia force effective on the weight 50 in the direction to move the bars 60 to their release positions shown in Fig. 6, and therefore the piston will be free to move to its full feathered position established by the stop block 35.

As noted, while it is desired in accordance with the invention that the propeller be free to feather when the engine is shut off and the hydraulic pressure is relieved in flight, it is also desired that feathering be prevented when the engine is shut off while the airplane is on the ground. Under these conditions, the control handle 47 is retained in the position causing the hydraulic fluid to be continuously supplied to the cylinder 20, and the control system will therefore retain the propeller at minimum pitch, with the piston rod 23 in contact with the stop nut 31, until the engine is completely dead. Furthermore, this pressure will remain effective for an appreciable interval, namely a minute or more, until it is finally lost as a result of gradual leakage of the oil back to the reservoir 41.

Unfeathering of the propeller in flight may be accomplished by moving the control handle 47 out of its feathering position and then turning the engine over with the usual starter. As soon as sufficient pressure is built up in this way to move the piston away from stop 35, the propeller will begin to windmill, and the resulting rapid pressure build-up will move the piston back to low pitch position. The bars 60 will have no effect on this operation since they will simply slide through the slots 68 until the shoulders 70 are clear of the latch plates 65 even though they will be urged toward latching engagement with the tongues 66, because the inclined surfaces 71 lying rearwardly thereon of the shoulders 70 will cam them past the tongues 66.

It is also possible with the control system of the invention to provide for unfeathering of the propeller in flight without the necessity of using the engine starter or other mechanism, hydraulic or electric force. This result is achieved by establishing the feathered position of the blades at an angle sufficient to prevent windmilling rotation in all normal flight conditions but to cause windmilling at a higher air speed which can be attained by diving the airplane. For example, if the invention is applied to a twin engine airplane capable of a maximum air speed of 180 m.p.h. in level flight on a single engine, the maximum blade pitch position may be established at a blade angle such that windmilling will occur if the airplane is dived at a speed in excess of 220 m.p.h. The propeller would therefore remain feathered under normal flight conditions, but unfeathering would be effected by diving the plane to initiate windmilling, which would in turn enable the engine to turn over and to develop hydraulic pressure tending to cause further reduction in blade pitch until and after the engine started. The proper maximum blade pitch to accomplish these results is established by appropriate proportioning of the high pitch stop 35 and/or the use of appropriate shims 37 therewith.

The invention accordingly provides a control system offering a variety of important practical advantages. It is simple to construct and install, it requires a minimum of maintenance, and it is independent of engine speed and responsive only to aceleration and deceleration of the engine. All these advantages are provided by the invention without affecting the normal operation of the airplane and the basic pitch control system with which it is used.

Cross reference is made to my copending application Serial No. 751,912, filed July 30, 1958 and assigned to the same assignee as this application.

While the forms of aparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a control system for the blades of an adjustable pitch propeller having a drive engine, the combination of a rotary hub structure including adjustable supporting means for said blades, a hydraulic cylinder mounted on said hub structure coaxially with the rotary axis thereof, a piston reciprocable in said cylinder and having a piston rod extending coaxially therefrom within said hub structure, means connecting said piston with said supporting means to decrease the pitch of said blades in response to movement of said piston outwardly of said cylinder and to increase said blade pitch to feathered position in response to movement of said piston inwardly of said cylinder, a control spring arranged to bias said piston inwardly of said cylinder, means including a line connected with said cylinder for supplying hydraulic pressure fluid to said cylinder to move said piston against said control spring, selectively operable valve means in said line for relieving said pressure fluid supply, a flywheel mounted for rotational movement on said piston rod, a bar extending from said flywheel parallel with said piston rod, a latch member carried by said hub structure and having a slot therein receiving said bar therethrough to establish first and second limit positions for said rotational movement of said flywheel, means connected between said flywheel and said piston rod for biasing said flywheel oppositely to the direction of rotation of said hub structure to said first limit position, a shoulder on said bar arranged for latching engagement with said latch member in said first limit position of said flywheel to block said piston from movement inwardly of said cylinder beyond an intermediate position corresponding to a predetermined intermediate blade pitch position, said shoulder being arranged to clear said latch member in said second limit position of said flywheel, and said flywheel and said biasing means being proportioned to provide for rotational movement of said flywheel against said biasing means to said second limit position in response to deceleration of said hub structure to provide for feathering of said propeller when said pressure fluid supply is relieved by operation of said valve means.

2. In a control system for the blades of an adjustable pitch propeller having a drive engine, the combination of a rotary hub structure including adjustable supporting means for said blades, a hydraulic cylinder mounted on said hub structure coaxially with the rotary axis thereof, a piston reciprocable in said cylinder and having a piston rod extending coaxially therefrom within said hub structure, means connecting said piston with said supporting means to decrease the pitch of said blades in response to movement of said piston outwardly of said cylinder and to increase said blade pitch to feathered position in response to movement of said piston inwardly of said cylinder, a control spring arranged to bias said piston inwardly of said cylinder, means including a line connected with said cylinder for supplying hydraulic pressure fluid to said cylinder to move said piston against said control spring, selectively operable valve means in said line for relieving said pressure fluid supply, a flywheel mounted for rotational movement on said piston rod, a bar extending from said flywheel parallel with said piston rod, a latch member carried by said hub structure and having a slot therein receiving said bar therethrough to establish first and second limit positions for said rotational movement of said flywheel, means connected between said flywheel and said piston rod for biasing said flywheel oppositely to the direction of rotation of said hub structure to said first limit position, a shoulder on said bar arranged for latching engagement with said latch member in said first limit position of said flywheel to block said piston from movement inwardly of said cylinder beyond an intermediate position corresponding to a predetermined intermediate blade pitch position, said shoulder being arranged to clear said latch member in said second limit position of said flywheel, said flywheel and said biasing means being proportioned to provide for rotational movement of said flywheel against said biasing means to said second limit position in response to deceleration of said hub structure to provide for feathering of said propeller when said pressure fluid supply is relieved by operation of said valve means, and said bar including an inclined edge portion leading from said shoulder to the rearward end portion thereof to cam said bar toward said second limit position during movement of said piston outwardly of said cylinder from the feathering position thereof.

References Cited in the file of this patent

UNITED STATES PATENTS

| Re. 24,530 | Biermann | Sept. 2, 1958 |
| 2,368,950 | Thomas | Feb. 6, 1945 |
| 2,477,868 | Forman | Aug. 2, 1949 |
| 2,609,057 | Crowhurst | Sept. 2, 1952 |

FOREIGN PATENTS

| 564,735 | Canada | Oct. 14, 1958 |